(12) United States Patent
Choi

(10) Patent No.: US 7,679,713 B2
(45) Date of Patent: Mar. 16, 2010

(54) LIQUID CRYSTAL DISPLAY DEVICE AND MANUFACTURING METHOD THEREOF

(75) Inventor: Su Seok Choi, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 316 days.

(21) Appl. No.: 11/798,619

(22) Filed: May 15, 2007

(65) Prior Publication Data

US 2008/0018845 A1 Jan. 24, 2008

(30) Foreign Application Priority Data

May 15, 2006 (KR) ............... 10-2006-0043550

(51) Int. Cl.
*G02F 1/1339* (2006.01)
(52) U.S. Cl. .................................... 349/156
(58) Field of Classification Search ............ None
See application file for complete search history.

(56) References Cited

U.S. PATENT DOCUMENTS

| 7,525,621 | B2 * | 4/2009 | Mun et al. ............ 349/129 |
| 2002/0033927 | A1 * | 3/2002 | Mun et al. ............ 349/156 |
| 2006/0170853 | A1 * | 8/2006 | Jeong et al. .......... 349/124 |
| 2009/0128725 | A1 * | 5/2009 | Mun et al. ............ 349/39 |

FOREIGN PATENT DOCUMENTS

| EP | 0 634 685 A2 | 1/1995 |
| JP | 7-120728 | 5/1995 |
| JP | 9-90326 | 4/1997 |

* cited by examiner

*Primary Examiner*—Sung H Pak
(74) *Attorney, Agent, or Firm*—Morgan Lewis & Bockius LLP

(57) ABSTRACT

A liquid crystal display device includes an upper substrate; a lower substrate facing the upper substrate; a liquid crystal layer formed between the upper and the lower substrates; common electrodes and pixel electrodes formed parallel to each other in pixel regions of the lower substrate; and polymer walls formed between the upper and the lower substrates. A manufacturing method includes forming gate and data lines on a lower substrate, the gate and data lines intersecting each other to define a plurality of pixel regions; forming thin film transistors at respective intersections of the gate and data lines; forming common electrodes and pixel electrodes in parallel with each other in the pixel regions; joining an upper substrate with the lower substrate so that a liquid crystal layer is disposed between the upper and the lower substrates; and forming a plurality of polymer walls between the upper and the lower substrates.

21 Claims, 12 Drawing Sheets

LIQUID CRYSTAL DISPLAY DEVICE AND MANUFACTURING METHOD THEREOF

This application claims the benefit of Korean Patent Application No. 10-2006-043550 filed in Republic of Korea on May 15, 2006, which is hereby incorporated by reference.

BACKGROUND OF THE INVENTION

1. Field of the Invention

The present invention relates to a display apparatus, and more particularly, to a liquid crystal display and a method for manufacturing the same.

2. Discussion of the Related Art

In a related art liquid crystal display device, a liquid crystal layer having an anisotropic dielectric constant characteristic is formed between an upper substrate and a lower substrate. When an electric filed is applied to the liquid crystal layer, the molecular arrangement of a liquid crystal material is changed, thereby controlling the amount of light transmit through the upper substrate and a desired image is displayed. The related art liquid crystal display devices include a thin film transistor-liquid crystal display (TFL-LCD) display using a TFT as a switching device.

The related art TFT LCD device uses an electro-optical characteristic of the liquid crystal material to control light transmit through the upper substrate. The electro-optical characteristic of the liquid crystal material is determined by anisotropy of liquid crystal material and a state of molecular orientation of the liquid crystal material. Accordingly, it is important to control the molecular orientation of the liquid crystal material by forming an orientation film on the upper and lower substrates. The orientation films align the liquid crystal material, thereby improving the quality of images. When aligning the orientation film, a rubbing method is mainly used. In the related art rubbing method, the orientation film made of polyamide material is formed on the upper and lower substrates and a rubbing roll is applied to the orientation film.

In recent years, such related art rubbing method may have reached its limit because it became difficult to finely adjusting a variety of process variables while aligning the molecular orientation of the liquid crystal material. In addition, it has become difficult to prevent the generation of electrostatic. Thus, photo alignment, ion beam alignment, and other suitable alignment method have been studied to eliminate the use of the related art alignment film (hence, promotes no physical contact while controlling the molecular orientation of the liquid crystal material).

However, in related art non-contact alignment method, such as the photo alignment method and the ion beam alignment method, productivity of the liquid crystal display device becomes low because the manufacturing process becomes difficult. In addition, no substitute material to the related art alignment film has been developed in the non-contact alignment method. Accordingly, there is a continuous demand for developing equipment that produces more effective alignment process and alignment materials that optimize the alignment process.

In addition, the related art non-contact alignment method using a shear force includes the method using a magnetic field and an electric field. In the above discussed related art non-contact alignment methods, the liquid crystal material interacts with each other by the external force exerted by the photo process and the ion beam process or the external magnetic field and the electric field, thereby forming the initial alignment. In these related art alignment method, the liquid crystal material directly contacts the substrate since no orientation film is used. Accordingly, the alignment anchoring force is minimized or eliminated, but in either case, it acts very weakly.

As such, in the related art non-contact alignment methods, the alignment anchoring force does not work properly. In other words, even when the liquid crystal material is aligned at the desired direction initially, the force that allows the liquid crystal material to return to the initial alignment state after the orientation of the liquid crystal material is changed does not work properly, thereby deteriorating the orientation resilience.

SUMMARY OF THE INVENTION

Accordingly, the present invention is directed to a liquid crystal display device and manufacturing method thereof that substantially obviates one or more of the problems due to limitations and disadvantages of the related art.

An object of the present invention is to provide liquid crystal display device that implements a liquid crystal layer including the liquid crystal material and the polymer.

Another object of the present invention is to provide manufacturing method of forming such liquid crystal display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as claimed and broadly described, a liquid crystal display device includes an upper substrate; a lower substrate facing the upper substrate; a liquid crystal layer formed between the upper substrate and the lower substrate; common electrodes and pixel electrodes formed parallel to each other in pixel regions of the lower substrate; and polymer walls formed between the upper substrate and the lower substrate.

In another aspect, a liquid crystal display device includes an upper substrate; a lower substrate facing the upper substrate; a liquid crystal layer formed between the upper substrate and the lower substrate; common electrodes and pixel electrodes formed parallel to each other in pixel regions of the lower substrate; a plurality of first polymer walls formed between the upper substrate and the lower substrate; and a plurality of second polymer walls formed parallel to the first polymer walls in the pixel region between the upper substrate and the lower substrate, wherein the first and the second polymer walls have different dielectric constant.

In another aspect, a manufacturing method of a liquid crystal display device includes forming gate lines and data lines on a lower substrate, the gate and data lines intersecting each other to define a plurality of pixel regions; forming a plurality of thin film transistors at respective intersections of the gate and data lines; forming common electrodes and pixel electrodes in parallel with each other in the pixel regions; joining an upper substrate with the lower substrate so that a liquid crystal layer is disposed between the upper substrate and the lower substrate; and forming a plurality of polymer walls between the upper substrate and the lower substrate.

Yet, in another aspect, a manufacturing method of a liquid crystal display device includes forming gate lines and data lines on a lower substrate, the gate and data lines intersecting each other to define a plurality of pixel regions; forming a plurality of thin film transistors at respective intersections of the gate and data lines; forming common electrodes and pixel electrodes in parallel with each other in the pixel regions; joining an upper substrate with the lower substrate so that a liquid crystal layer is disposed between the upper substrate and the lower substrate; and forming a plurality of first polymer walls along the gate lines between the upper substrate and the lower substrate and a plurality of second polymer walls parallel to the gate lines in the pixel regions between the upper and lower substrates, wherein the first and second polymer walls have different dielectric constant.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are comprised to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1A:
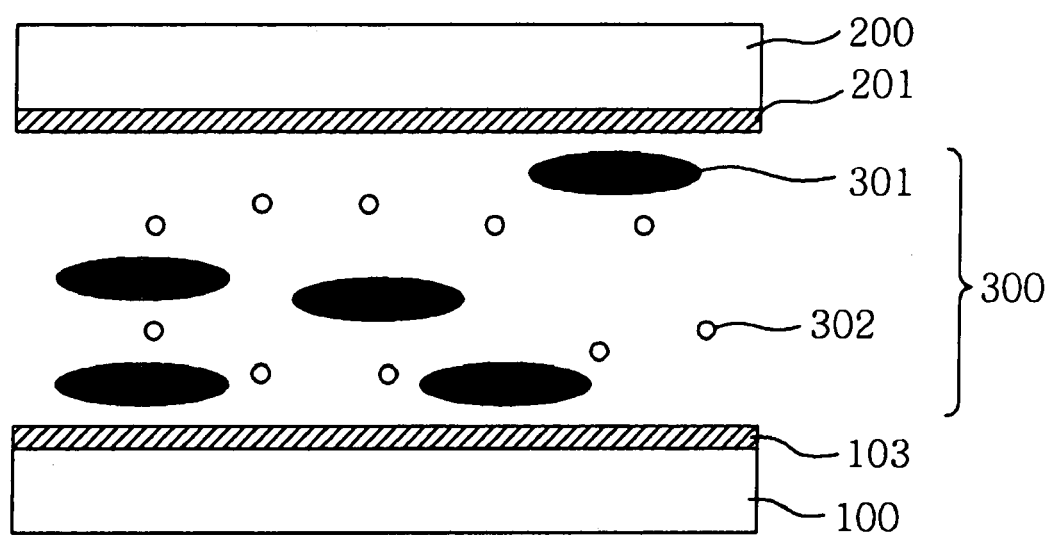
FIGS. 1A to 1C are cross sectional views showing an exemplary liquid crystal display device according to a first exemplary embodiment of the present invention.
Figure 1B:
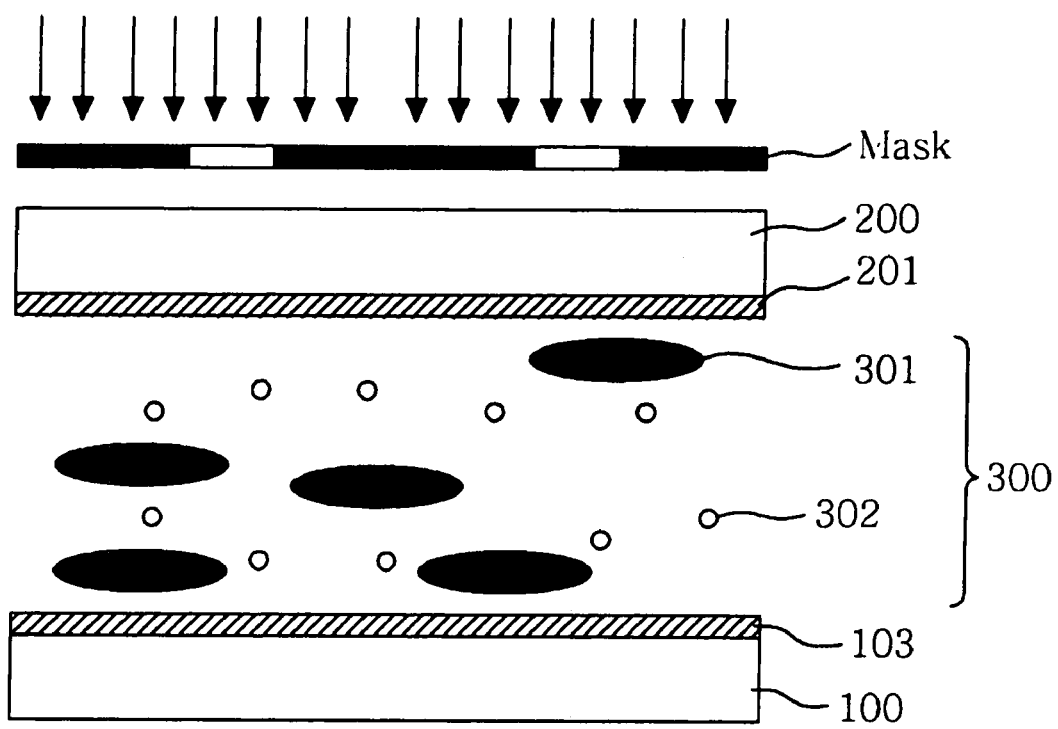
Figure 1C:
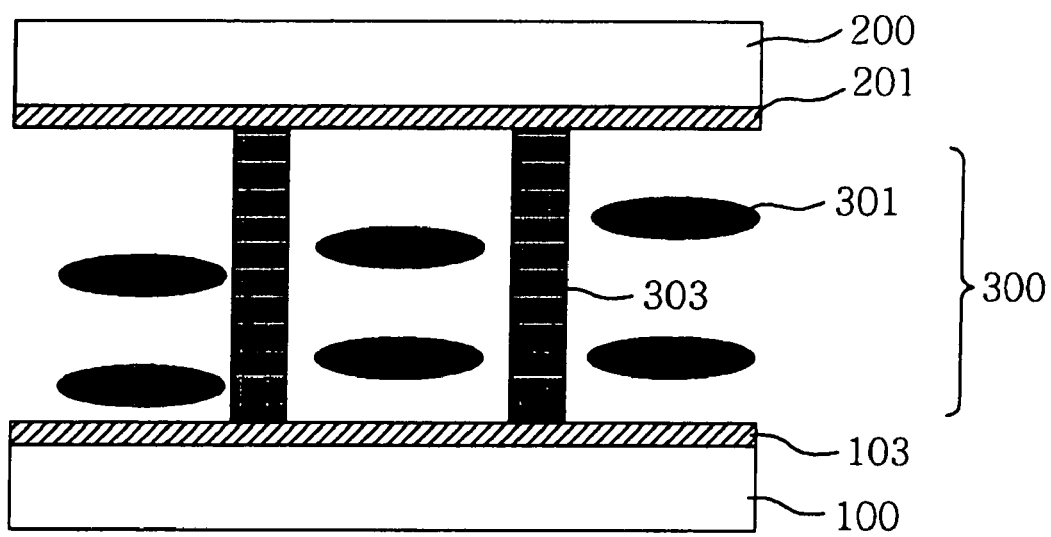

FIGS. 1A to 1C are cross sectional views showing an exemplary liquid crystal display device according to a first exemplary embodiment of the present invention. The liquid crystal display device according to the first exemplary embodiment may be formed in an ASM (Axially Symmetric Aligned Microcell) mode. The exemplary ASM mode liquid crystal display device includes an upper substrate 200 and a lower substrate 100 facing each other and a liquid crystal layer 300 formed therebetween. The liquid crystal material 301 is distributed throughout the liquid crystal layer 300. Here, the liquid crystal layer 300 is divided into a plurality of liquid crystal regions by polymer walls 303.

A transparent common electrode 201 is formed on the upper substrate, and a transparent pixel electrode 103 is formed on the lower substrate 100. Short axes of liquid crystal material 301 in each of the liquid crystal regions are aligned perpendicular to the surfaces of the upper substrate 200 and the lower substrate 100. With such an arrangement, there is little change in contrast when viewed from any direction, and therefore the viewing angle properties can be improved.

The exemplary ASM mode liquid crystal display device does not require an alignment process, such as rubbing method, to adjust the orientation of the liquid crystal material. When the liquid crystal 301 and a monomer 302 are mixed and filled (FIG. 1A) and then ultraviolet rays is used to irradiate the materials using a photo mask in a matrix pattern (FIG. 1B), phases of the liquid crystal material 301 and the polymer (monomer 302) are separated to form the polymer walls 303 (FIG. 1C). The liquid crystal material 301 has a homogeneous array in which the long axis of each liquid crystal material 301 is horizontally aligned to the surfaces of the substrates. Further, the liquid crystal materials are mixed so that the d/p ratio (d: cell thickness, p: pitch of liquid crystal injected into a cell) is approximately 1/4, thereby forming a 360 degree-twisted array having the liquid crystal 301 lying in one direction.

Figure 2:
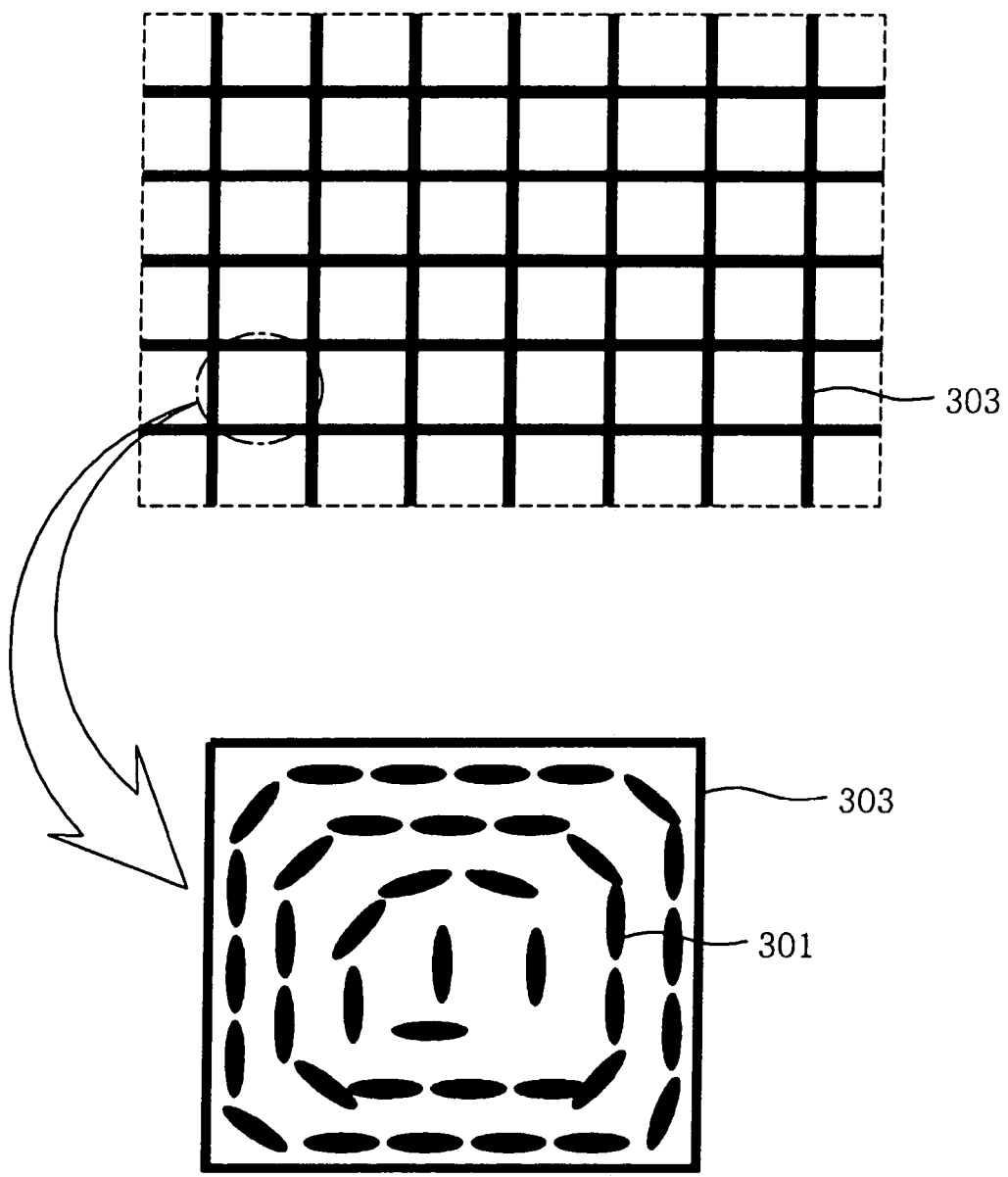
FIG. 2 is a plane view showing an exemplary alignment pattern of polymer walls in the exemplary liquid crystal display device of FIG. 1C.

FIG. 2 is a plane view showing an exemplary alignment pattern of the polymer walls 303 in the exemplary liquid crystal display device of FIG. 1C. As shown in FIG. 2, the liquid crystal material 301 is aligned along the polymer walls 303 by the dielectric constant of the polymer walls 303. As the polymer walls 303 are formed in a matrix pattern, the liquid crystal material 301 is arranged in a bent shape along the contour of the polymer walls 303. In another words, when no voltage is applied, the liquid crystal material 301 is aligned along the polymer walls 303.

The liquid crystal display device includes various modes depending on the properties of the liquid crystal material and the structure of the electrode pattern. Thus, it is not limited to the first exemplary embodiment of the present invention that the other modes can be expected to solve number of problems generated by the orientation film. For example, the structure can be properly modified so that the orientation film is no longer required. In addition, the exemplary pattern of the polymer walls 303 shown in FIG. 2 can induce the orientation of the liquid crystal material 301.

Figure 3:
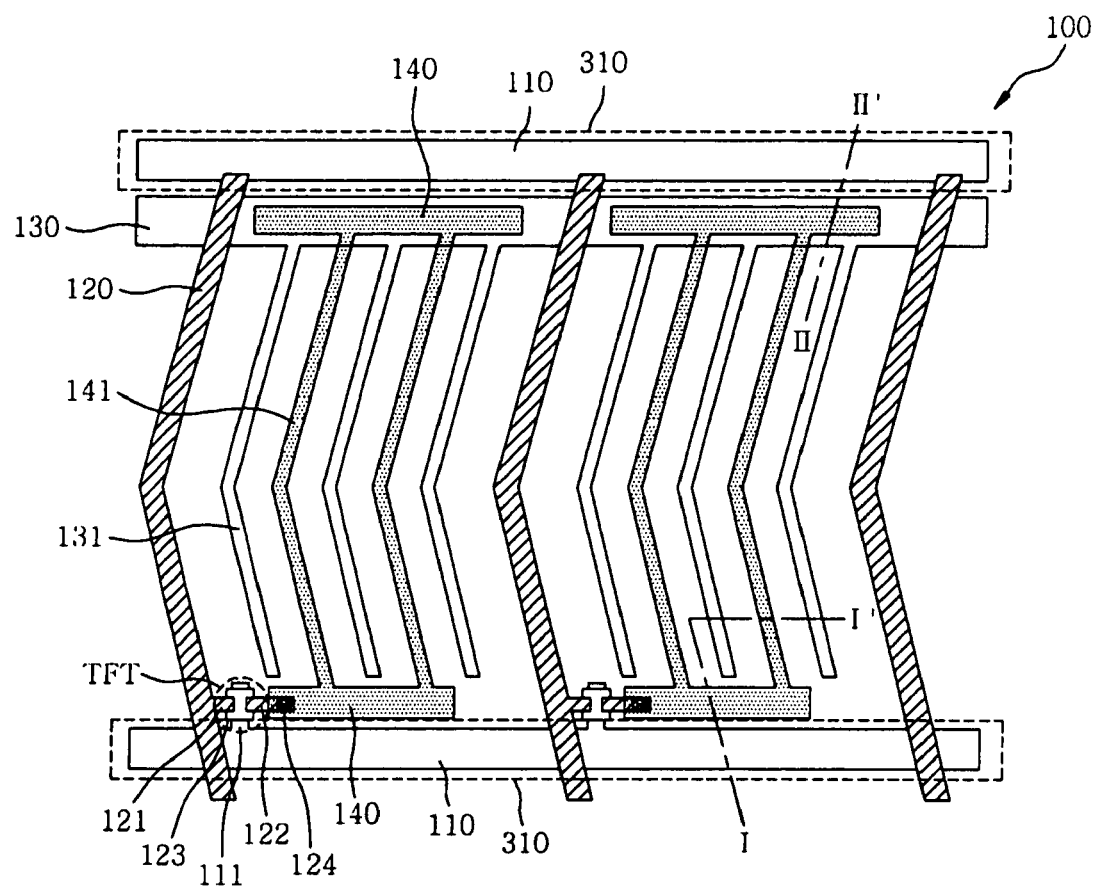
FIG. 3 is a plane view showing the exemplary liquid crystal display device according to the first exemplary embodiment of the present invention.
Figure 4:
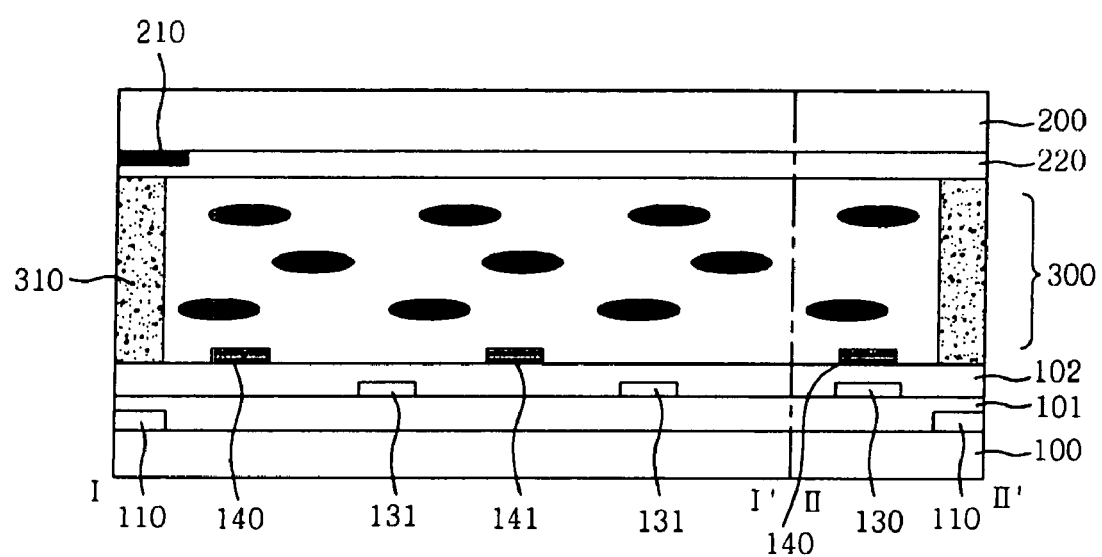
FIG. 4 is a cross sectional view taken along lines I-I' and II-II' of FIG. 3.

FIG. 3 is a plane view of the liquid crystal display device according to the first exemplary embodiment of the present invention. As shown in FIGS. 3 and 4, the exemplary liquid crystal display device according to the first exemplary embodiment includes an upper substrate 200 and a lower substrate 100 that are bonded to face each other and having the liquid crystal layer 300 therebetween.

The upper substrate 200 and the lower substrate 100 are formed as the transparent insulating substrate. Gate lines 110 and data lines 120 are formed on the lower substrate 100 to define pixel regions by intersecting each other, a thin film transistor (TFT) is formed at appropriate intersections of the gate lines 110 and the data lines 120, and common electrodes 131 and pixel electrodes 141 disposed in parallel with each other in the pixel region.

Specifically, the gate lines 110 and a common line 130 are formed parallel to each other in a horizontal direction, and the data lines 120 are formed to cross the gate lines 110 and the common line 130 in a vertical direction. A plurality of common electrodes 131 are formed extending from the common line 130 and they are formed parallel to the data lines 120. The pixel electrodes 141 are made of a transparent conductive metal having a relatively better optical transmittance, such as indium tin oxide (ITO). The pixel electrodes 141 are electrically contacting the drain electrodes 122 of the thin film transistor TFT within contact holes 124. A plurality of pixel electrodes 141 are connected to each other through a lead line.

As shown in FIG. 3, when the common electrodes 131 and the pixel electrodes 141 are formed in a bent shape, liquid crystal material are aligned in at least two directions, thereby enlarging the range of viewing angle.

The thin film transistor TFT includes gate electrodes 111 extended from the gate lines 110, a semiconductor layer 123 formed of un-doped amorphous silicon material disposed on the gate electrodes 111, and source electrodes 121 and drain electrodes 122 formed on the semiconductor layer 123. Although not shown, an ohmic contact layer formed of n+ hydrogen amorphous silicon or the like is disposed on the semiconductor 123. The ohmic contact layer is doped with n-type impurity in higher concentration. The source electrodes 121 are extended from the data lines 120 to the upper portion of the gate electrodes 111, and the drain electrodes 122 are disposed at a predetermined interval from the source electrodes 121 and contacting the pixel electrodes 141 within the contact holes 124.

In addition, a gate insulation film 101 is formed over the gate lines 110 and the gate electrodes 111. A protective film 102 is formed over the gate insulating film 101 on the lower substrate 100. A black matrix 210 formed in a predetermined pattern to prevent light leakage and red, green and blue color filters 220 overlapping the black matrix 210 are formed on the upper substrate 200.

The liquid crystal layer 300 and the polymer walls 310 are formed between the upper substrate 200 and the lower substrate 100. The dielectric anisotropy Δε of the liquid crystal layer 300 has a positive value, and such a liquid crystal layer 300 forms a homogeneous array where the long axis of the liquid crystal material aligns horizontally to the surfaces of the upper substrate 200 and lower substrates 100.

When the liquid crystal materials are arranged in a direction parallel to the horizontal electric field formed between the common electrodes 131 and the pixel electrodes 141, it is possible to control the orientation of the liquid crystal material using a strong anchoring force. The polymer walls 310 formed along the gate lines 110 (FIG. 3) induces the orientation of the liquid crystal layer 300 by pulling a bulk layer of the liquid crystal layer 300 using the strong anchoring force. Thus, orientation direction of the liquid crystal material and the initial alignment of the liquid crystal material can be achieved by the polymer walls 310 without the orientation film.

As described above, the function of polymer walls 310 removes the need for the orientation film. When the distance between the adjacent polymer walls 310 is within a range of 250 μm to 350 μm, orientation control is further stabilized and the alignment anchoring force is easily aquired.

Additionally, portions of the gate lines 110 are formed in the non-pixel regions that do not affect the aperture ratio. Accordingly, when the polymer walls 310 are formed along the gate lines 110, damage to the display properties may be minimized. The polymer walls 310 improve the alignment anchoring force by inducing the orientation of the liquid crystal layer 300. In addition, the polymer walls 310 are used as the spacers to maintain a cell gap between the upper substrate 200 and the lower substrate 100. When the polymer walls 310 having a predetermined width and distance are formed, it is possible to control of the alignment direction of the liquid crystal material or the orientation of the long axis of the liquid crystal material by observing a change in the electro-optical properties of the liquid crystal materials in the liquid crystal layer 300. At that time, the distance and width between the polymers walls 310 are used as the variables.

As discussed earlier, in the liquid crystal layer 300 between the polymer walls 310, the liquid crystal material are aligned along the polymer walls 310 when there is no voltage applied. Therefore, when the polymer walls 310 of a predetermined pattern are formed and liquid crystal material having a homogeneous array is used, the long axis of the liquid crystal materials are aligned in a various directions along the polymer walls 310, thereby improving the viewing angle.

Accordingly, the liquid crystal material having a homogeneous array includes better electro-optical characteristics compared to the liquid crystal material having a heterogeneous array. The orientation of liquid crystal material can be controlled using appropriate monomer material or reactive liquid crystal monomer mixed with the based liquid crystal material.

An IPS (In Plane Switching) mode liquid crystal display device is one of the examples implementing the liquid crystal material having a heterogeneous array. In the IPS mode liquid crystal display device, the common electrodes 131 and pixel electrodes 141 are formed on a lower substrate 100 and controls only an azimuthal orientation. The IPS mode liquid crystal display device does not need to control a tilt angle unlike in the ASM (Axially Symmetric Aligned Microcell) mode or in a VA (Vertical Alignment) mode, where the initial alignment of liquid crystal material is in a vertical direction. Accordingly, the liquid crystal material having a homogeneous array may implement more effective electro-optical properties by properly adjusting the distance between the polymer walls 310.

Figure 5A:
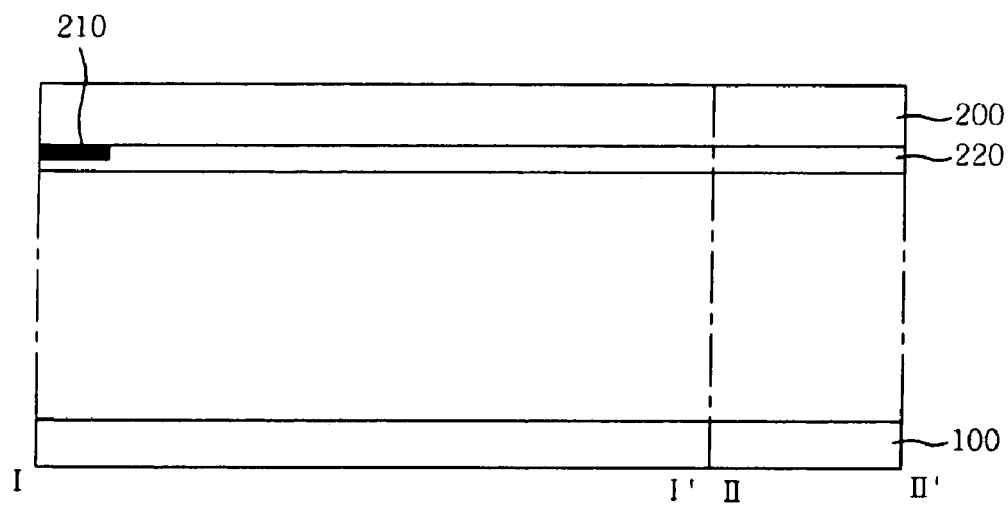
FIGS. 5A to 5D are cross sectional views showing an exemplary manufacturing method of the exemplary liquid crystal display device according to the first exemplary embodiment of the present invention.

FIGS. 5A to 5D are cross sectional views showing an exemplary manufacturing method of the exemplary liquid crystal display device according to the first exemplary embodiment of the present invention. As shown in FIG. 5A, an upper substrate 200 and a lower substrate 100 are prepared. A black matrix 210 and red, green and blue color filters 220 or the like are formed on the upper substrate 200.

Figure 5B:
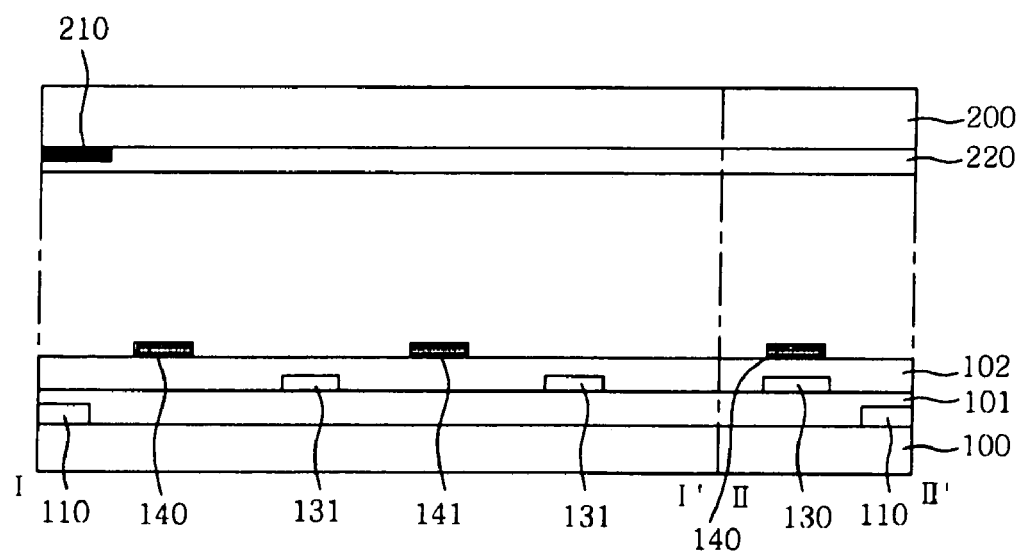

Next, as shown in FIG. 5B, gate lines 110, data lines 120, a thin film transistor TFT, common electrodes 131, pixel electrodes 141, and other suitable elements are formed on the lower substrate 100. The gate lines 110 and the data lines 120 intersect each other to define the pixel regions. The thin film transistor TFT is formed at appropriate intersections of the gate lines 110 and the data lines 120. The gate electrodes 111 of the thin film transistor TFT are contacting the gate lines 110, the source electrodes 121 are contacting the data lines 120, and the drain electrodes 122 are contacting the pixel electrodes 141. The common electrodes 131 and the pixel electrodes 141 are formed parallel to each other in the pixel regions.

Figure 5C:
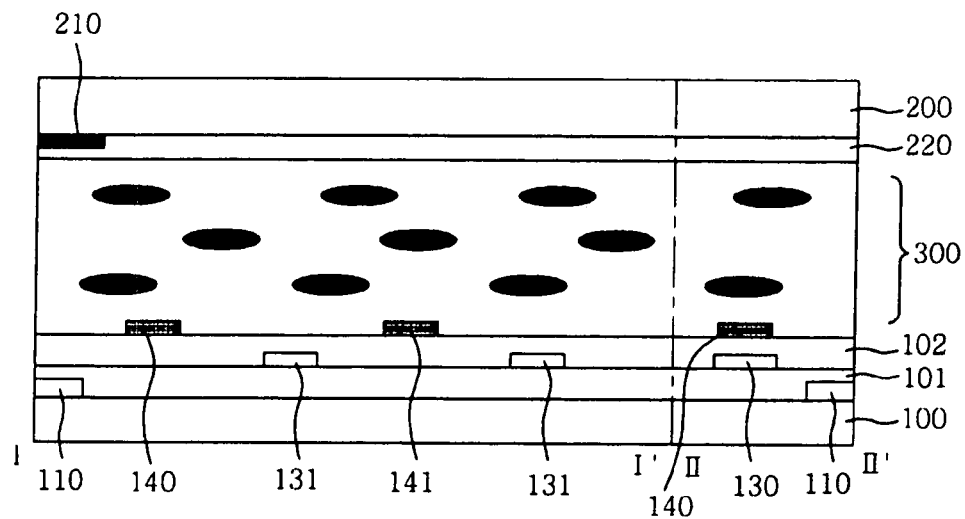

Next, as shown in FIG. 5C, the upper substrate 200 and the lower substrate 100 are bonded, and a liquid crystal layer 300 is formed between the upper substrate 200 and the lower substrate 100. Next, as shown in FIG. 5D, the polymer walls 310 are formed between the upper substrate 200 and the lower substrate 100.

Figure 5D:
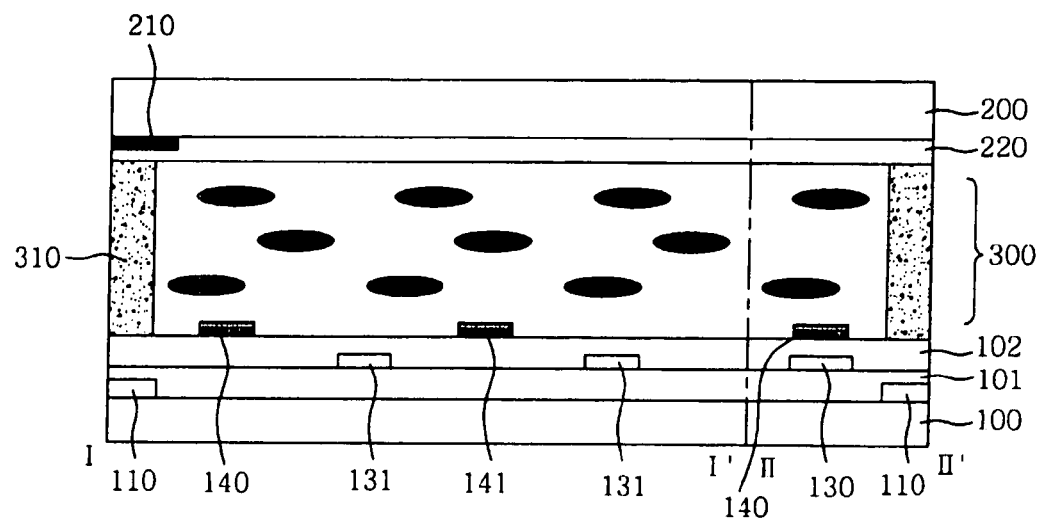

In FIGS. 5C and 5D, a liquid crystal layer 300 including a mixture of liquid crystal material and monomer is used. After the liquid crystal layer 300 is formed, ultraviolet rays are irradiated to form the polymer walls 310. The liquid crystal layer having the liquid crystal material and monomer begins a polymerization reaction when the ultraviolet rays are irradiated. The polymerization reaction causes the phase separation to form the polymer walls 310 within the liquid crystal layer 300.

In the phase separation of the liquid crystal material and polymer (monomer), location of polymerization may be controlled by the location where the ultraviolet rays are irradiated in the liquid crystal layer 300. In this process, a photo mask is used. The polymer walls 310 are formed at portions where ultraviolet ray is irradiated, and liquid crystal regions are formed at portions where ultraviolet ray is blocked. At this time, the dielectric anisotropy Δε of the liquid crystal material comprising the liquid crystal layer 300 has a positive value, and when the distance between the polymer walls 310 is in the range greater than 250 μm and less than 350 μm, the highest stability of the liquid crystal material orientation can be achieved.

Figure 6:
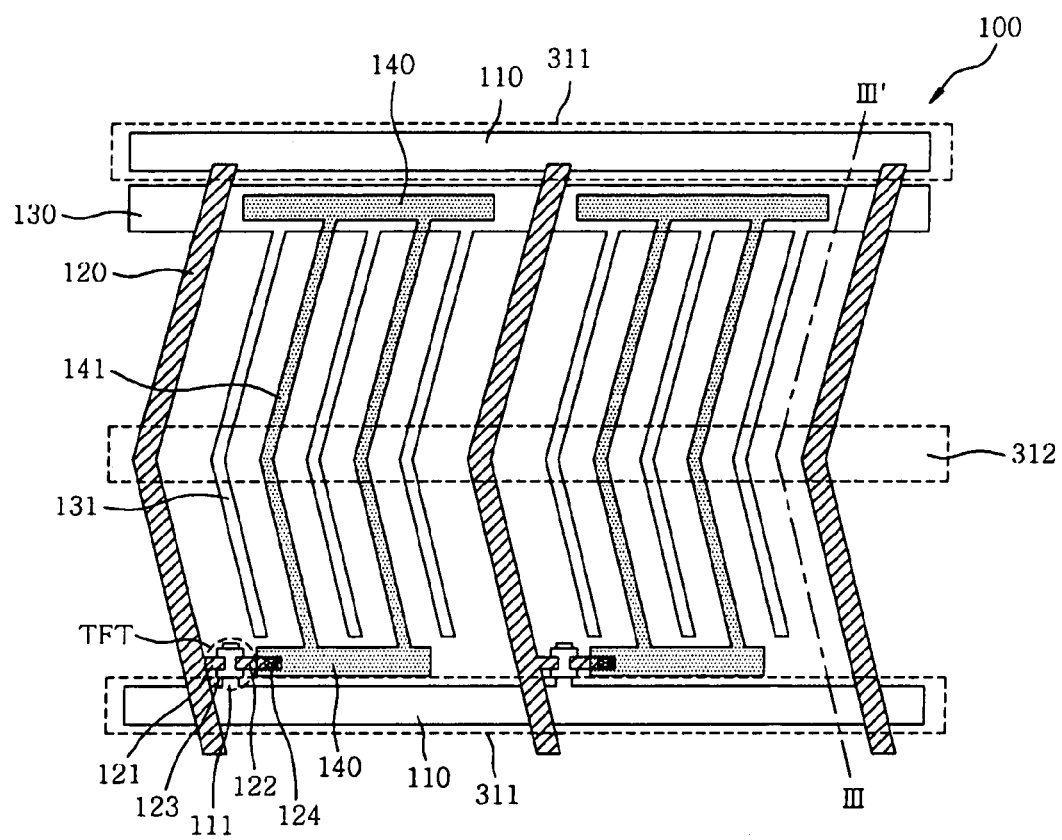
FIG. 6 is a plane view showing an exemplary liquid crystal display device according to a second exemplary embodiment of the present invention.
Figure 7:
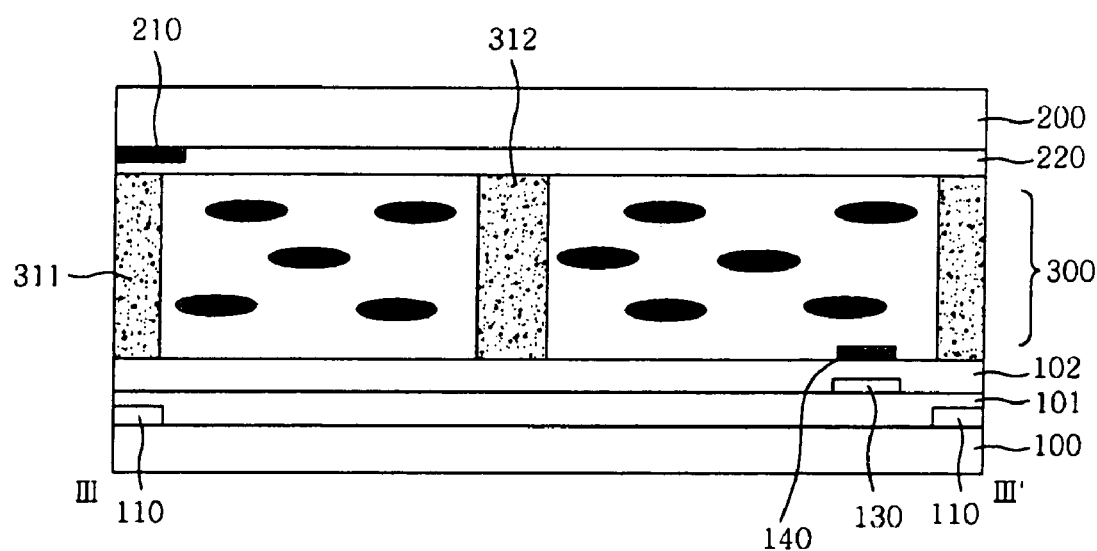
FIG. 7 is a cross sectional view taken along line III-III' of FIG. 6.

FIG. 6 is a plane view showing an exemplary liquid crystal display device according to a second exemplary embodiment of the present invention. As shown in FIGS. 6 and 7, a first polymer wall 311 is formed along the gate lines 111 and a second polymer wall 312 is formed in parallel with the gate lines 110 in the pixel regions. The dielectric constant $\epsilon 1$ of the first polymer wall 311 and the dielectric constant $\epsilon 2$ of the second polymer wall 312 have a different value, and the dielectric constant $\epsilon$ of the liquid crystal layer 300 in the long axis direction has a value between the dielectric constant $\epsilon 1$ and the dielectric constant $\epsilon 2$.

The first polymer wall 311 and the second polymer wall 312 are formed as different dielectric bodies having a different dielectric constant. When the magnitude of the dielectric constant is designed to be $\epsilon 1 < \epsilon < \epsilon 2$, the dielectric anisotropy applied to the liquid crystal material is increased. Having such dielectric constant differences induce similar effects as that of the first exemplary embodiment when the electric field or magnetic field is applied, thereby stabilizing the initial alignment.

The dielectric anisotropy is the difference between the dielectric constant of liquid crystal materials in the long axis direction and the dielectric constant in the short axis direction. Reaction of the liquid crystal material varies as the strength of the voltage changes, hence the amount of light transmit is controlled by the optical anisotropy.

As discussed above, the dielectric constant $\epsilon 1$ of the first polymer wall 311 and the dielectric constant $\epsilon 2$ of the second polymer wall 312 are made different by using the dielectric anisotropy of liquid crystal material, thereby increasing the alignment anchoring force. The other components of FIGS. 6 and 7 are identical to those of FIGS. 3 and 4. Accordingly, a detailed description will be omitted.

Figure 8A:
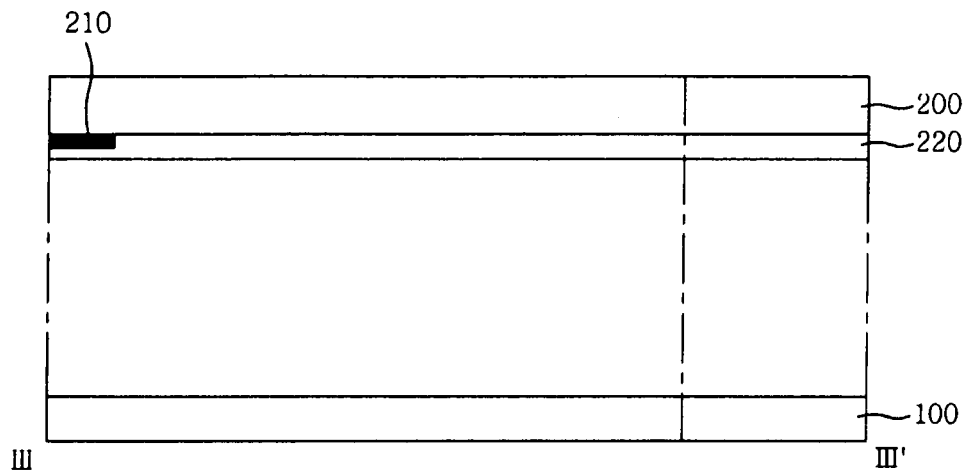
FIGS. 8A to 8D are cross sectional views showing an exemplary manufacturing method of the exemplary liquid crystal display device according to the second exemplary embodiment of the present invention.

FIGS. 8A to 8D are cross sectional views showing an exemplary manufacturing method of the exemplary liquid crystal display device according to the second exemplary embodiment of the present invention. As shown in FIG. 8A, an upper substrate 200 and a lower substrate 100 are prepared. A black matrix 210 and red, green and blue color filters 220 or the like are formed on the upper substrate.

Figure 8B:
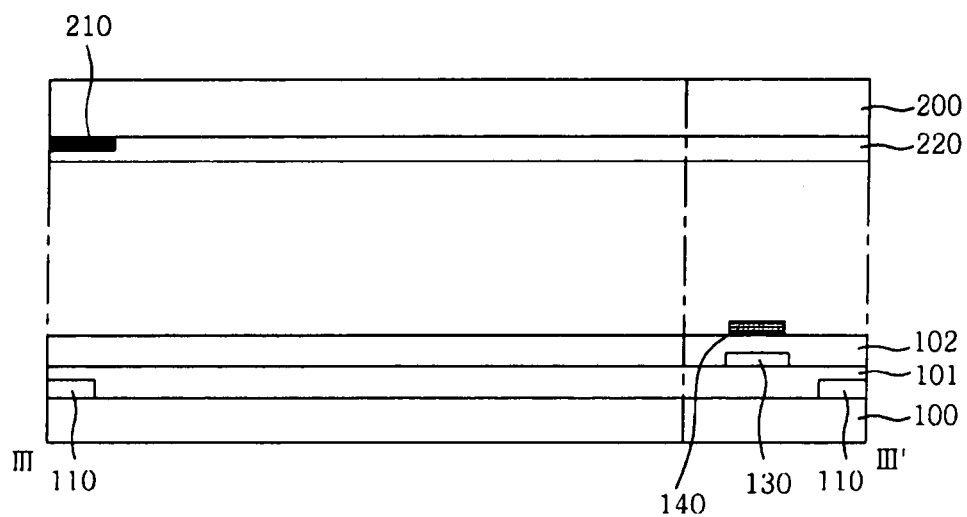

Next, as shown in FIG. 8B, gate lines 110, data lines 120, a thin film transistor TFT, common electrodes 131, pixel electrodes 141, and other suitable elements are formed on the lower substrate 100. Similar to the first exemplary embodiment, the gate lines 110 and the data lines 120 are formed intersecting each other to define the pixel regions. The thin film transistor TFT is formed at appropriate intersections of the gate lines 110 and the data lines 120. The gate electrodes 111 of the thin film transistor TFT is contacting the gate lines 110, the source electrodes 121 is contacting the data lines 120, and the drain electrodes 122 is contacting the pixel electrodes 141. The common electrodes 131 and the pixel electrodes 141 are formed parallel to each other in the pixel regions.

Figure 8C:
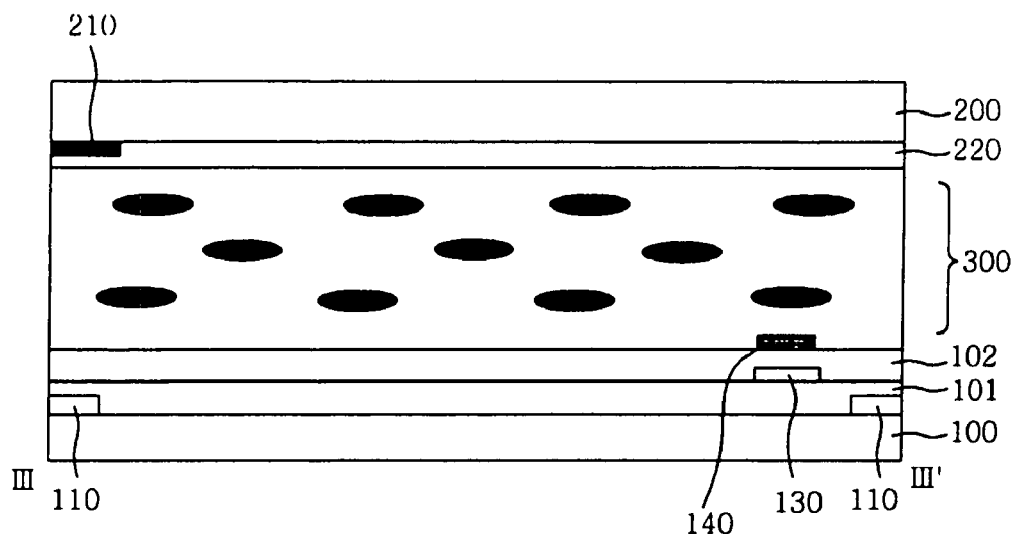

Next, as shown in FIG. 8C, the upper substrate 200 and the lower substrate 100 are bonded, and a liquid crystal layer 300 is formed between the upper substrate 200 and the lower substrate 100. Next, as shown in FIG. 8D, a first polymer wall 311 and a second polymer wall 312 are formed between the upper substrate 200 and the lower substrate 100.

Figure 8D:
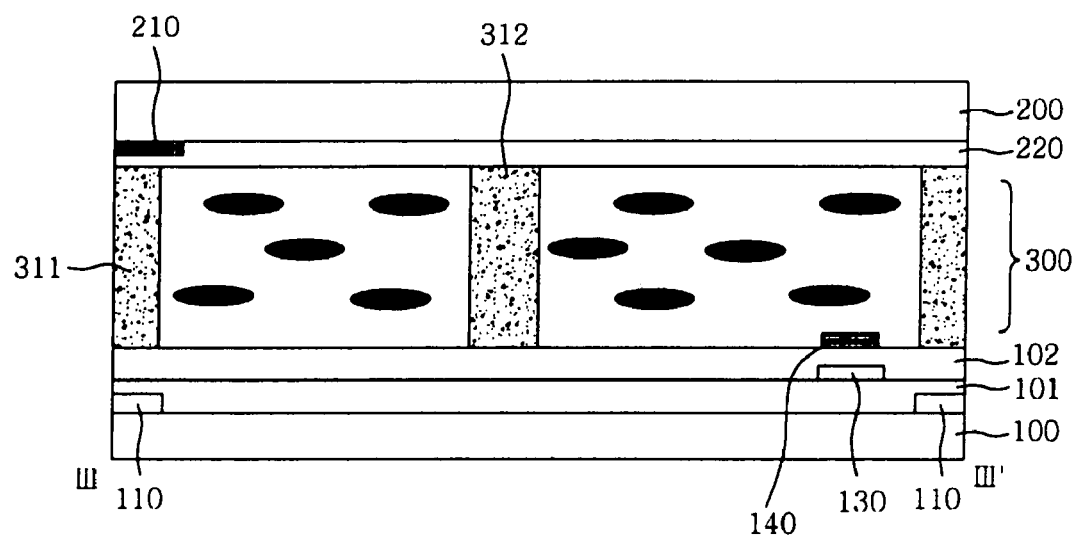

In FIGS. 8C and 8D, a liquid crystal layer 300 including a mixture of liquid crystal material and monomer is used. After the liquid crystal layer 300 is formed, ultraviolet rays are irradiated to form first and second polymer walls 311 and 312. The application of ultraviolet rays induces the polymerization reaction in the monomers. The polymerization reaction causes the phase separation to form first and second polymer walls 311 and 312 in the liquid crystal layer 300.

In the phase separation of the liquid crystal material and polymer (monomer), location of polymerization may be controlled by the location where the ultraviolet rays are irradiated in the liquid crystal layer 300. In this process, a photo mask is used. The polymer walls 310 are formed at portions where ultraviolet ray is irradiated, and liquid crystal regions are formed at portions where ultraviolet ray is blocked.

The dielectric constants $\epsilon 1$ and $\epsilon 2$ of the first polymer wall 311 and second polymer wall 312 have different values. When the dielectric constant $\epsilon$ of the liquid crystal layer 300 in the long axis direction has a value between the dielectric constant $\epsilon 1$ of the first polymer wall 311 and the dielectric constant $\epsilon 2$ of the second polymer wall 312, and the distance between the first polymer walls 311 in the pixel regions is in the range greater than 250 μm and less than 350 μm, the highest alignment stability of the e liquid crystal material can be achieved.

As described above, the liquid crystal display device according to the exemplary embodiments of the present invention and manufacturing method thereof can solve problems caused by the orientation film by inducing a stable orientation of a liquid crystal layer, thereby increasing the production yield and minimizing the production time.

It will be apparent to those skilled in the art that various modifications and variations can be made in the liquid crystal display device and manufacturing method thereof of the present invention without departing from the spirit or scope of the invention. Thus, it is intended that the present invention covers the modifications and variations of this invention provided they come within the scope of the appended claims and their equivalents.

What is claimed is:

1. A liquid crystal display device, comprising:
   an upper substrate;
   a lower substrate facing the upper substrate;
   a liquid crystal layer formed between the upper substrate and the lower substrate;
   common electrodes and pixel electrodes formed parallel to each other in pixel regions of the lower substrate; and
   polymer walls formed between the upper substrate and the lower substrate,
   wherein an initial alignment and a liquid crystal director of the liquid crystal layer are controlled by the polymer walls without orientation films.

2. The liquid crystal display device of claim 1, further comprising:
   gate lines and data lines crossing each other to define a plurality of pixel regions on the lower substrate; and
   a plurality of thin film transistors formed at respective intersections of the gate lines and data lines.

3. The liquid crystal display device of claim 1, wherein the dielectric anisotropy Δε of the liquid crystal layer has a positive value.

4. The liquid crystal display of claim 1, wherein the long axis direction of liquid crystal molecules comprising the liquid crystal layer is aligned horizontal to surfaces of the upper substrate and the lower substrate.

5. The liquid crystal display device of claim 2, wherein the polymer walls are formed along the gate lines.

6. The liquid crystal display device of claim 2, wherein the distance between the two adjacent polymer walls is greater than 250 μm and less than 350 μm.

7. The liquid crystal display device of claim 1, wherein the common electrodes and the pixel electrodes are formed in a bent shape.

8. A liquid crystal display device, comprising:
an upper substrate;
a lower substrate facing the upper substrate;
a liquid crystal layer formed between the upper substrate and the lower substrate;
common electrodes and pixel electrodes formed parallel to each other in pixel regions of the lower substrate;
a plurality of first polymer walls formed between the upper substrate and the lower substrate; and
a plurality of second polymer walls formed parallel to the first polymer walls in the pixel region between the upper substrate and the lower substrate, wherein the first and the second polymer walls have different dielectric constant.

9. The liquid crystal display device of claim 8, further comprising:
gate lines and data lines crossing each other to define a plurality of pixel regions on the lower substrate and;
a plurality of thin film transistors formed at respective intersections of the gate lines and the data lines.

10. The liquid crystal display device of claim 8, wherein the dielectric anisotropy ϵ of the liquid crystal layer has a positive value.

11. The liquid crystal display device of claim 8, wherein the dielectric constant of the first polymer wall and the dielectric constant of the second polymer wall have a different value, and
the dielectric constant of the liquid crystal molecules in the long axis direction has a value between the dielectric constant of the first polymer wall and the dielectric constant of the second polymer wall.

12. The liquid crystal display device of claim 8, wherein the common electrodes and the pixel electrodes are formed in a bent shape.

13. A manufacturing method of a liquid crystal display, comprising:
forming gate lines and data lines on a lower substrate, the gate and data lines intersecting each other to define a plurality of pixel regions;
forming a plurality of thin film transistors at respective intersections of the gate and data lines;
forming common electrodes and pixel electrodes in parallel with each other in the pixel regions;
joining an upper substrate with the lower substrate so that a liquid crystal layer is disposed between the upper substrate and the lower substrate; and
forming a plurality of polymer walls between the upper substrate and the lower substrate,
wherein an initial alignment and a liquid crystal director of the liquid crystal layer are controlled by the polymer walls without orientation films.

14. The method of claim 13, wherein the polymer walls are disposed along the gate lines.

15. The method of claim 13, wherein the liquid crystal layer includes a mixture of liquid crystal material and monomer, wherein the ultraviolet rays are irradiated to the liquid crystal layer to form the polymer walls.

16. The method of claim 13, wherein the dielectric anisotropy $\Delta\epsilon$ of the liquid crystal layer has a positive value.

17. The method of claim 13, wherein the distance between the two adjacent polymer walls is greater than 250 μm and less than 350 μm.

18. A manufacturing method of a liquid crystal display, comprising:
forming gate lines and data lines on a lower substrate, the gate and data lines intersecting each other to define a plurality of pixel regions;
forming a plurality of thin film transistors at respective intersections of the gate and data lines;
forming common electrodes and pixel electrodes in parallel with each other in the pixel regions;
joining an upper substrate with the lower substrate so that a liquid crystal layer is disposed between the upper substrate and the lower substrate; and
forming a plurality of first polymer walls along the gate lines between the upper substrate and the lower substrate and a plurality of second polymer walls parallel to the gate lines in the pixel regions between the upper and lower substrates, wherein the first and second polymer walls have different dielectric constant.

19. The method of claim 18, wherein the liquid crystal layer includes a mixture of liquid crystal material and monomer, wherein the ultraviolet rays are irradiated to the liquid crystal layer to form the polymer walls.

20. The method of claim 18, wherein the dielectric anisotropy ϵ of the liquid crystal layer has a positive value.

21. The method of claim 18, wherein the dielectric constant of the first polymer wall and the dielectric constant of the second polymer wall have a different value, and the dielectric constant of the liquid crystal molecules in the long axis direction has a value between the dielectric constant of the first polymer wall and the dielectric constant of the second polymer wall.

* * * * *